Nov. 24, 1970  TADAMI TAOKA ET AL  3,541,841
ELECTROMAGNETIC LOADING DEVICE
Filed Dec. 6, 1968  3 Sheets-Sheet 1

INVENTORS
Tadami Taoka
Tetuya Sugai
BY
ATTORNEYS

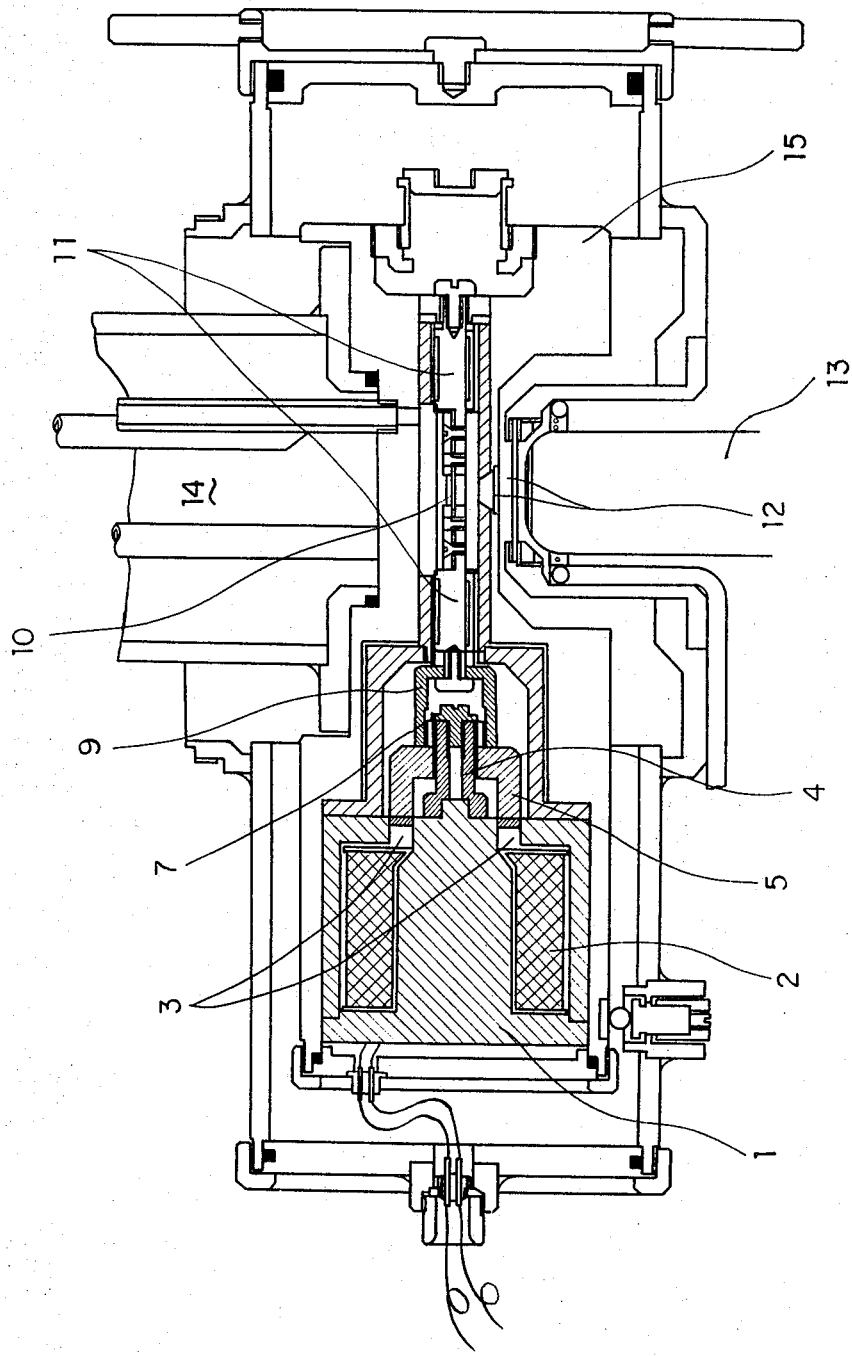

United States Patent Office 3,541,841
Patented Nov. 24, 1970

3,541,841
ELECTROMAGNETIC LOADING DEVICE
Tadami Taoka and Tetuya Sugai, Tokyo, Japan, assignors to Yawata Iron & Steel Co., Ltd., Tokyo, Japan
Filed Dec. 6, 1968, Ser. No. 781,837
Int. Cl. H01f 7/13
U.S. Cl. 73—90                                     1 Claim

ABSTRACT OF THE DISCLOSURE

An electromagnetic loading device to be used as a power source for a tensile strength testing machine and the like, in which a mobile iron piece to be attracted into an electromagnet is cylindrically formed and is so arranged that the opening edge of the mobile iron piece may be interposed into gaps formed in the upper part of the electromagnet and the relation between the attracting power of the electromagnet and an exciting current may be varied in a straight line extending over a relatively wide range, so that the load can be controlled exactly and smoothly.

BACKGROUND OF THE INVENTION

Field of the invention

The present invention is to provide an electromagnetic loading device to be used as a power source for testing machines such as a tensile strength testing machine and an impact value testing machine for materials of various kinds or as a tractive power source for an apparatus for producing semi-conductor elements and as a power source for other apparatuses.

DESCRIPTION OF THE PRIOR ART

Heretofore, as for a loading device used in testing machines such as a tensile strength testing machine, an impact value testing machine and other testing machines, there has been used only a liquid pressure such as oil pressure, hydraulic pressure or a mechanical means such as screw and the like. In the case of a liquid pressure, a device of a large-sized and complicated structure is required, and moreover, the load cannot be freely controlled in its magnitude. In the case of a mechanical means, it is unavoidably attended with drawbacks that the loading is influenced by the mechanical preciseness, loosening of screws or mechanical impact and friction. In both cases it was impossible to regulate smoothly and rapidly the loading speed and loading amount, extending over a wide range.

Further, in manufacturing semi-conductor elements, a minute regulation of a tensile strength is required when applying the tensile strength to the elements during the manufacturing process, as is often the case. Also in this case the apparatus used therefor must be complicated and the operation thereof is attended with difficulties, if the strength is to be varied.

SUMMARY OF THE INVENTION

The present invention is to eliminate the above-mentioned drawbacks by using an electromagnetic force as a power source for operating a tensile strength testing machine or an impact value testing machine or an apparatus for producing semi-conductor elements. The present invention has for its main object the provision of a loading device for use in a tensile strength testing machine, an impact value testing machine and the like, in which the load can be controlled exactly and smoothly at any loading speed to any desired strength.

Another object of the present invention is to apply the loading device of the present invention to an apparatus, in which a continuous application of minute force is required, such as an apparatus for producing extremely fine wires and strips.

BRIEF DESCRIPTION OF THE DRAWINGS

FIG. 5 is a longitudinal side view showing an example of the application of the device of the present invention to a tensile strength testing machine.

DESCRIPTION OF THE PREFERRED EMBODIMENT

The present invention is to provide a loading device, in which a mobile iron piece to be attracted into an electromagnet is cylindrically formed and is so arranged that the opening edge of the mobile iron piece may be interposed into gaps formed in the upper part of the electromagnet and the relation between the attracting power of the electromagnet and an exciting current may be varied in a straight line, extending over a relatively wide range.

The present invention shall be explained with reference to FIG. 1 to FIG. 4.

Figure 1:
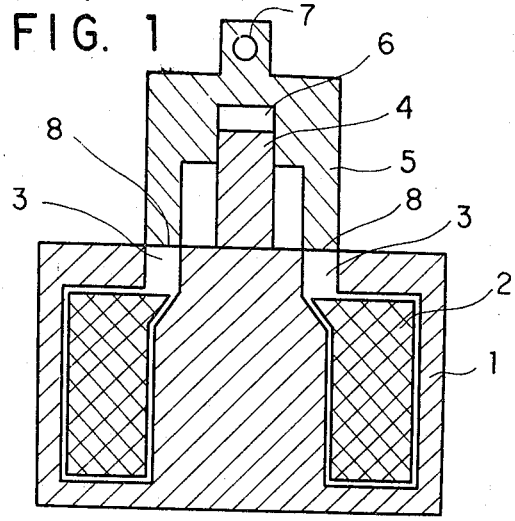
FIG. 1 is a sketch for showing the principle of the present invention.
Figure 2:
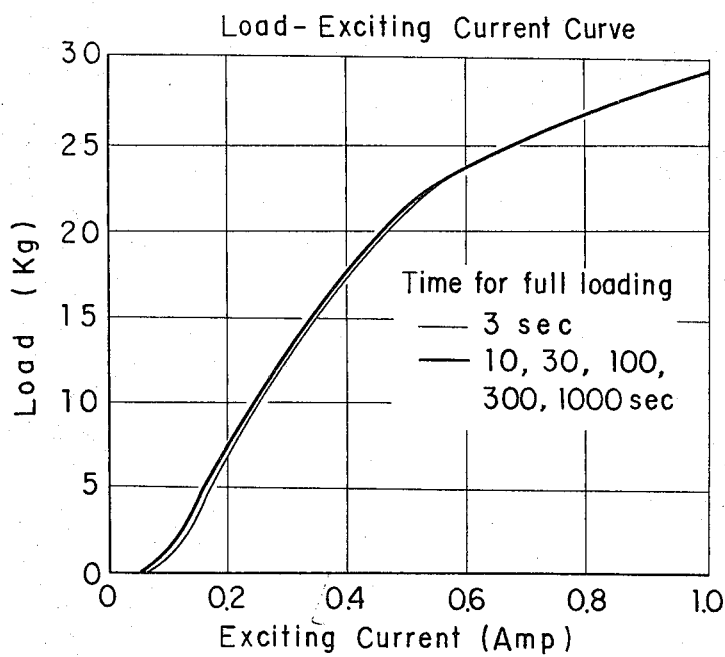
FIG. 2 is a diagram showing an example of the relation between the exciting current and load in the present invention.

In FIG. 1, 1 is a cylindrical electromagnet wound by exciting coils 2. On the upper surface of the said electromagnet there are provided with annular gaps 3, into which a mobile iron piece 5 may be interposed, as being attracted by a magnetic power of the electromagnet 1. 4 is a guide made of a non-magnetic material for leading the mobile piece. The mobile iron piece 5 is also cylindrically formed, one end of which is opened in such a manner that the opening may be opposite to the annular gap 3 provided on the upper surface of the electromagnet 1 and the edge part 8 of the opening may be attracted into the gap 3. 6 is a guide channel, into which the said non-magnetic guide is interposed. 7 is a part for fitting with a test piece or another material 10 to be connected with the mobile iron piece 5. Consequently, it is possible to control the exciting force of the electromagnet 1 by controlling an electric current to be applied to the electromagnet 1, therefore a load to be applied to the material 10 connected with the mobile iron piece 5 can be controlled. FIG. 2 is a diagram showing the relation between an exciting current and a load in the case of the diameter of the central magnetic core of the electromagnet 1 being made 22 mm. and the distance between the end surface of the said central magnetic core and the edge part 8 of the opening of the mobile iron piece 5 being made 0 mm., in which the time for full loading is set as 3 seconds, 10 seconds, 30 seconds, 100 seconds, 300 seconds and 1000 seconds.

Figure 3:
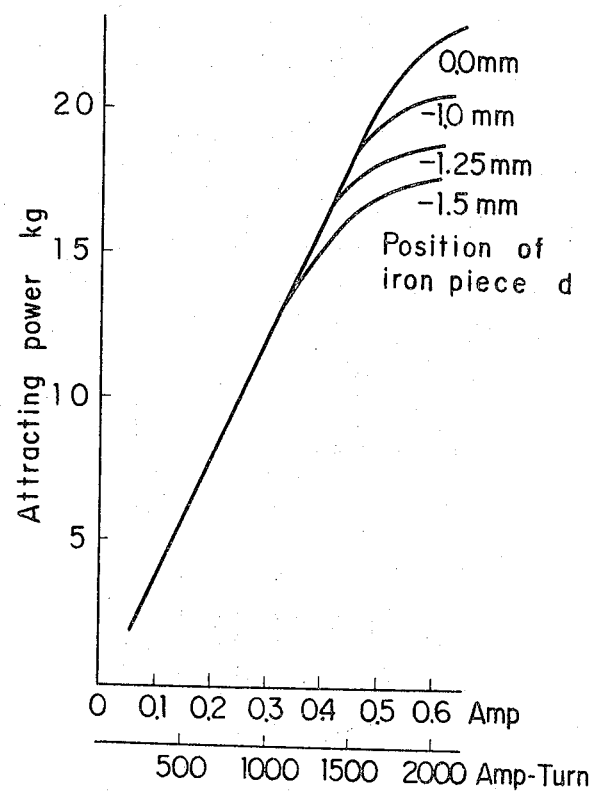
FIG. 3 is a diagram showing another example of the present invention.
Figure 4:
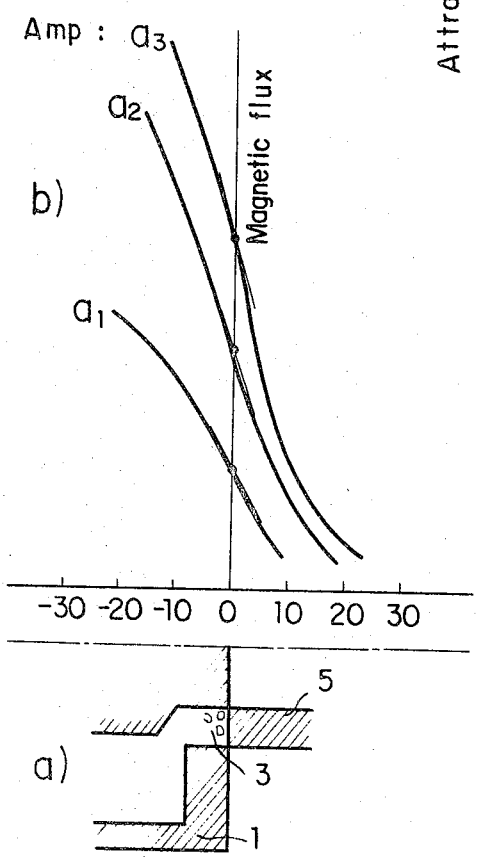
FIG. 4 is an explanatory diagram of the principle of generating the attracting force in the present invention.

FIG. 3 shows the relation between the electric current and the attracting power in the case of the distance between the central magnetic core and the mobile iron piece being changed. As is understood from these figures, in the present invention it is possible to change the relation between the attracting power (load) of the electromagnet and an exciting current to a linear one extending over a considerably wide range, if the electromagnet is cylindrically formed and the edge part 8 of the opening of the mobile iron piece 5 is so arranged that it may be attracted into the gap 3 provided on the said cylindrical part. With reference to FIG. 4 there will be explained the principle of the attracting power being generated due to the electromagnetic force. In FIG. 4, (a) shows the position of the mobile iron piece 5 and (b) shows a change in the total magnetic flux in the iron core of the electromagnet, as the position of the mobile iron piece 5 changes, when exciting currents $a_1$, $a_2$ and $a_3$ are applied respectively. In FIG. 4(b), the inclination of each magnetic flux curve at the position O designates the attracting power, when the mobile iron piece 5 is laid at the position of 0 mm., and the change in this attracting power due to an exciting current is shown by the 0.0 mm. curve in FIG. 3. In the same manner as this, an attracting power—exciting current curve can be drawn by changing the position of the mobile iron piece 5.

Figure 6:
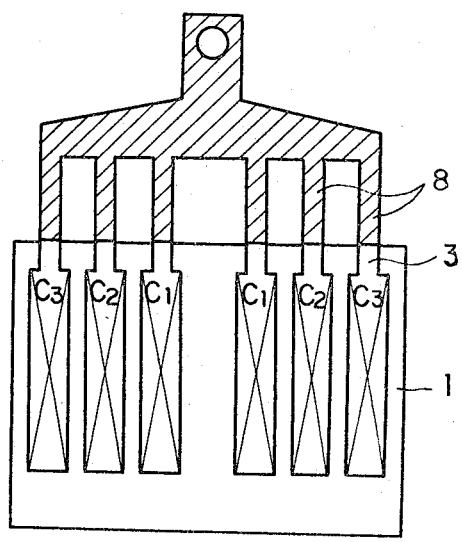
FIG. 6 is an explanatory view showing an example of a method for increasing an attracting power.

According to the present invention, as the attracting power—exciting current curve is made so that it can be coincided with the electromagnet within a certain range of the position of the mobile iron piece, the load stress does not change, even though the position of the mobile iron piece is changed on account of the test piece material fitted to the mobile iron piece being stretched by a load applied. Therefore, the device of the present invention can be said to be very suitable as a loading device. Further, the device of the present invention has advantages that the whole size thereof may be made very small, and can produce a great attracting power in spite of its small size. That is, because of the mobile iron piece being made a hollow cylindrical form, it has an attracting power twice as much as that of the mobile test piece which is not made a hollow cylindrical form. Even in case of necessity of further strengthening the attracting power, concentric annular gaps 3 can be provided on the electromagnet 1 and the mobile iron piece 5 can have a plurality of concentric annular portions which extend into the gaps 3, as is shown in FIG. 6. In this case, a plurality of exciting coils $c_1$, $c_2$ and $c_3$ are provided and are also concentrically positioned opposite the respective gaps and are so connected that the directions of the exciting currents may be alternately reversed. In this way, if the total peripheral length is made greater, the attracting power will be increased in proportion thereto.

As is above-mentioned, in the present invention the control of the load is performed by varying the exciting current. Therefore, it is possible not only to apply the load voluntarily and continuously, but also to vary voluntarily the loading speed. Therefore, the programming is easily performed, and the load can be smoothly applied.

FIG. 5 shows an example, in which the loading device of the present invention has been applied to a tensile strength testing machine. In a part of the main body 15 there is installed a low temperature vessel 14, the inside of which contains the loading device of the present invention comprising an electromagnet 1 and the mobile iron piece 5.

On the side wall of the main body 15 there is provided a glass window 12 and at the outside of the glass window there is set up an optical microscope, so that the state of a test piece 10 fixed to the mobile iron piece 5 can be observed with eyes. Then, the tip of the mobile iron piece 5 is provided with a supporting rod 11 for fitting up the test piece 10. The test piece 10 is fixed to a chuck on the tip of the supporting rod 11 at its one end and fixed to the main body 15 through another supporting rod at its another end.

If an electric current is applied to the electromagnet 1, and is varied according to the predescribed programming, depending upon the object of the test to be carried out, the load varies with the relation, as is shown in FIG. 2 resulting in that also the load applied to the test piece 10 is varied.

Further, when applying the device of the present invention to an apparatus for manufacturing semi-conductor elements, a semi-conductor material is interposed between the mobile iron piece 5 and the main body, and a predetermined tensile strength is given to the semi-conductor material, while controlling the electric current which excites the electromagnet 1, and meanwhile the predetermined operations can be carried out.

Further, the loading device of the present invention can be applied with ease to a constant loading testing machine for testing tension, compression and twist, a constant variable speed testing machine provide with a mechanism for shifting a standard position at a constant speed, a fatigue testing machine, in which two loading devices are used and a tension and compression are applied alternately and further other testing machines of various kinds. Still further, it can be applied also to an apparatus for manufacturing semi-conductor elements, in which a tension force is required to be applied. The loading device of the present invention has further following advantages that testing machines and other apparatuses, to which the device of the present invention is applied, can be made in a small-size, because the device of the present invention can be made in an extremely simplified construction, and moreover the device of the present invention itself can be manufactured very easily, because it contains few structural parts which require the mechanical precision. Further, a minute regulation of the load can be performed, as the load is determined depending upon the magnitude of an exciting current to be applied, when applying the device of the present invention. At last, it is also a favorable effect of the device of the present invention that the load amount is directly readable as an electric current value.

What is claimed is:

1. An electromagnetic loading device, comprising a mobile iron piece having means thereon to which to attach an object to which a load is to be applied and having a plurality of concentric annular projections thereon, and an electromagnet having a body and a plurality of concentric gaps on the upper surface thereof corresponding to and opposed to the projections on the mobile iron piece with the projections movable into said gaps and a plurality of concentric coils, one for each gap and positioned in the bottoms of said gaps, the relation between the attracting power of the electromagnet and the exciting current in the coils being a substantially straight line relation.

References Cited

UNITED STATES PATENTS

| 1,767,725 | 6/1930 | Waters et al. | 335—279 X |
| 3,127,766 | 4/1964 | Wolle | 73—95 X |
| 3,241,006 | 3/1966 | Boyko | 310—14 X |
| 3,312,842 | 4/1967 | Heuchling et al. | 310—30 X |

FOREIGN PATENTS

| 329,426 | 6/1958 | Switzerland. |
| 1,493,057 | 7/1967 | France. |

JERRY W. MYRACLE, Primary Examiner

U.S. Cl. X.R.

310—24